Oct. 6, 1953  E. W. MILHIZER  2,654,112
CASTER HAVING A SWIVEL LOCK
Filed Feb. 10, 1950
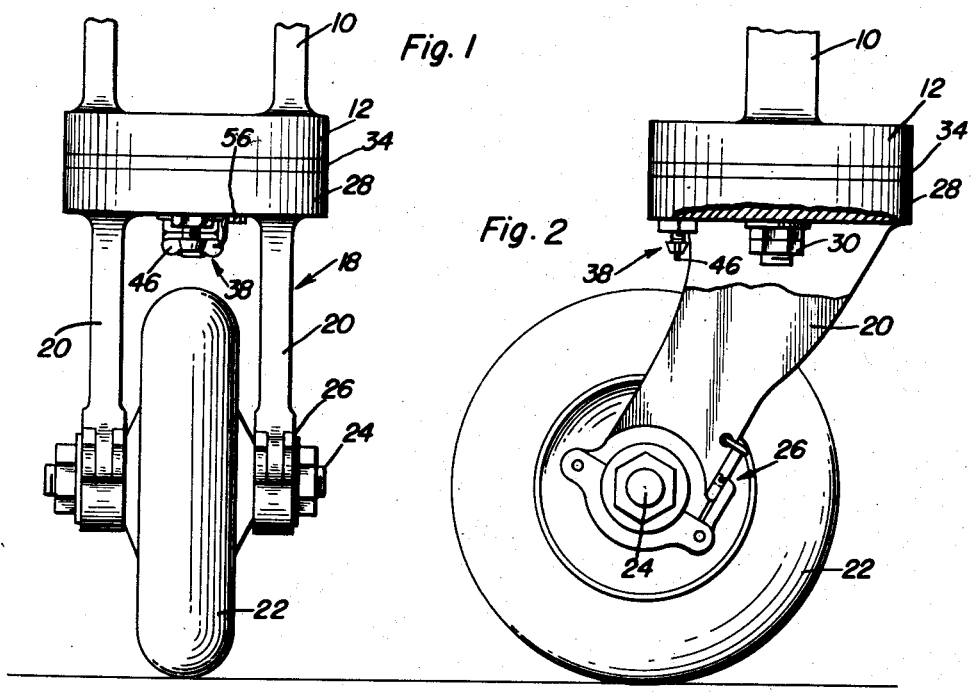
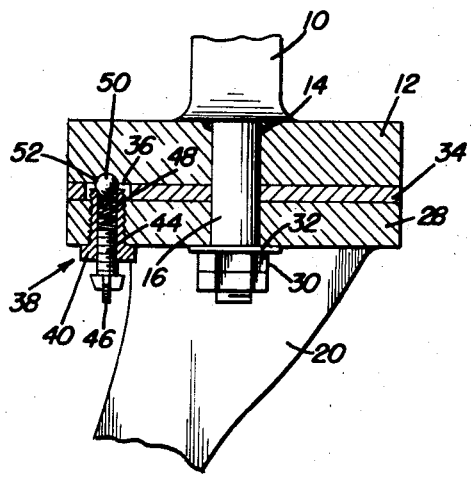
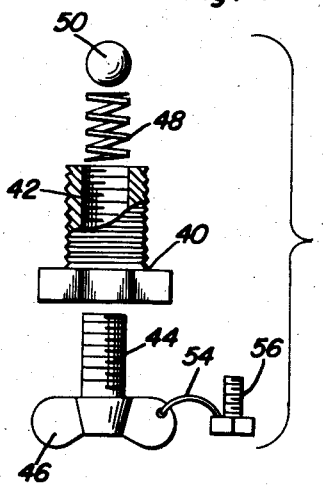
Inventor
Edward W. Milhizer
By
Attorneys

UNITED STATES PATENT OFFICE 2,654,112

CASTER HAVING A SWIVEL LOCK

Edward W. Milhizer, Detroit, Mich.

Application February 10, 1950, Serial No. 143,519

1 Claim. (Cl. 16—35)

This invention relates to a wheel mounting for tractors, trucks and other automotive vehicles, the primary object of which is to allow the wheels to revolve when backing up and the wheels to turn when going around curves but which automatically locks the wheels in proper position when the vehicle travels straight ahead.

Another important object of this invention is to provide a wheel mounting and pressure lock which is relatively simple in design and construction, easy to assemble for use on any vehicle, and which includes a means for adjusting the tension on the automatic locking mechanism to retain the wheel in a predetermined position on the chassis of the vehicle.

Yet another object of this invention is to provide a vehicle frame including a clevis, a yoke, a wheel rotatably supported between the legs of said yoke, means rotatably securing the web of said yoke to said clevis, and an adjustable pressure means for lockingly and releasably retaining said wheel and yoke in a fixed predetermined position on said clevis.

These, together with various ancillary objects and features of the invention which will later become apparent as the following description proceeds, are attained by the device, a preferred embodiment of which has been illustrated, by way of example only, in the accompanying drawings, wherein:

Figure 1 is a front elevational view of the device shown retaining a wheel on a portion of the chassis of the vehicle;

Figure 2 is a side elevational view of the device, parts being broken away to show details of construction;

Figure 3 is a vertical sectional view through the device and a portion of the wheel mounting, some parts being shown in elevation; and Figure 4 is a group elevational view of the parts making up the pressure lock.

Specific reference will now be made to the drawings. In the several views, in the accompanying drawings and in the following specification, similar reference characters indicate corresponding elements throughout.

Indicated generally at 10 are the leg portions of a clevis carried by the chassis (not shown) of a truck, tractor, trailer or other automotive vehicle. The legs 10 are secured to or integral with a bearing plate 12 and welded, as at 14, to the top of the plate 12 and extending through the middle thereof is a shaft 16.

A yoke 18 is provided having leg portions 20 and removably and rotatably supported between the leg portions 20 is a wheel 22. The wheel is provided with an axle 24 which is secured upon the free ends of the leg portions 20 of the yoke by means of a suitable clamp 26. The yoke includes a web portion 28 which is centrally apertured to receive the shaft 16, the shaft being retained on the web portion 28 by suitable closure nuts 30 threaded on the free end of the shaft, a washer 32 being interposed between the closure nuts and the bottom surface of the web portion 28 of the yoke. Thus, it will be seen that the wheel 22 and yoke 18 are rotatably mounted on the clevis so that the wheel functions, in effect, as a caster wheel.

Interposed between the clevis plate 12 and the web portion 28 of the yoke is a brass wear plate 34 which has a central aperture for receiving the shaft 16 and a further aperture 36 adjacent its peripheral edge for a purpose soon to appear.

A means 38 is provided for lockingly and releasably retaining the yoke and wheel in a predetermined position against rotation on the clevis. This means includes an externally threaded bushing 40, see Figures 3 and 4, retained in a suitable internally threaded aperture extending through the web portion 28 of the yoke, the bushing being internally threaded, as at 42, to adjustably receive an externally threaded bolt 44 having a wing type head 46 at one of its ends. It will be noted that the bushing 40 extends partially into the aperture 36 of the wear plate 34 and positioned within the bushing is a coil spring 48 which abuts at one end the free end of the adjusting bolt 44 and supports at its other end a steel ball 50. The spring pressed ball 50 extends through the aperture 36 in the wear plate 34 and is releasably received in a semi-spherical recess 52 provided in the clevis plate 12. The bolt 44 is employed for adjusting tension on the spring 48 and is retained by means of a suitable web or cable 54 upon a short headed bolt 56 retained in the web portion 28 of the yoke so that the adjusting bolt will not be lost when it is removed from the bushing 40.

In use, when the operator backs the vehicle up or makes a turn around a curve, the steel, spring-pressed ball 50 rides out of the recess 52 and the yoke and wheel become free to revolve about the clevis, as will be readily understood. When the operator of the vehicle straightens the vehicle out to travel straight ahead, the wheel and yoke rotate until the spring-pressed ball reengages the recess 52 to lockingly retain the wheel in the desired straight-ahead position. Adjustment of the tension on the spring 48 will affect the amount of rotative force required for the release of the spring-pressed ball from the recess 52 and its subsequent reengagement.

It will be obvious that the device is susceptible of use in various environments, for example, as a caster unit adapted to be secured to a piece of furniture.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

In combination, a vehicle frame including a clevis having a plate, a yoke, a wheel rotatably supported between the legs of said yoke, means rotatably securing the web portion of said yoke to said plate, a wear plate interposed between said clevis plate and said web portion, said wear plate being provided with an aperture, means for releasably locking said web portion on said clevis plate in a predetermined position against rotation, said means including a spring-pressed ball carried by said web portion, said ball normally extending through said wear plate aperture, said clevis plate having a recess for receiving said ball, and means operatively connected to said web portion for manual adjustment of tension on said ball.

EDWARD W. MILHIZER.

References Cited in the file of this patent

UNITED STATES PATENTS

| Number | Name | Date |
|---|---|---|
| Re. 23,459 | Budnick et al. | Feb. 12, 1952 |
| 2,198,270 | Maranville | Apr. 23, 1940 |
| 2,306,179 | Mulholland | Dec. 22, 1942 |
| 2,350,624 | McDaniel | June 6, 1944 |
| 2,505,852 | Budnick et al. | May 2, 1950 |